G. KNAUS.
MACHINE FOR CUTTING METAL ROLLS.
APPLICATION FILED NOV. 14, 1910.

1,000,681.

Patented Aug. 15, 1911.
3 SHEETS—SHEET 3.

Witnesses:

Inventor:
Gottfried Knaus
By J. R. Barnett
Atty.

UNITED STATES PATENT OFFICE.

GOTTFRID KNAUS, OF CHICAGO, ILLINOIS, ASSIGNOR TO SELLERS MANUFACTURING COMPANY, OF CHICAGO, ILLINOIS, A CORPORATION OF ILLINOIS.

MACHINE FOR CUTTING METAL ROLLS.

1,000,681.  Specification of Letters Patent.  Patented Aug. 15, 1911.

Original application filed February 5, 1910, Serial No. 542,316. Divided and this application filed November 14, 1910. Serial No. 592,310.

*To all whom it may concern:*

Be it known that I, GOTTFRID KNAUS, a citizen of the United States, residing at Chicago, in the county of Cook and State of Illinois, have invented certain new and useful Improvements in Machines for Cutting Metal Rolls, of which the following is a specification.

My invention relates to a machine adapted particularly for cutting diagonal grooves in the perimeters of metal rolls, such rolls, for example, as are used for rolling tie plates and forming diagonal ribs on the under side thereof; and the invention has for its object to provide certain novel constructions, arrangements and devices in a machine of this sort which will be hereinafter described and claimed.

The invention is illustrated, in a preferred embodiment, in the accompanying drawings, wherein—

Figure 1:
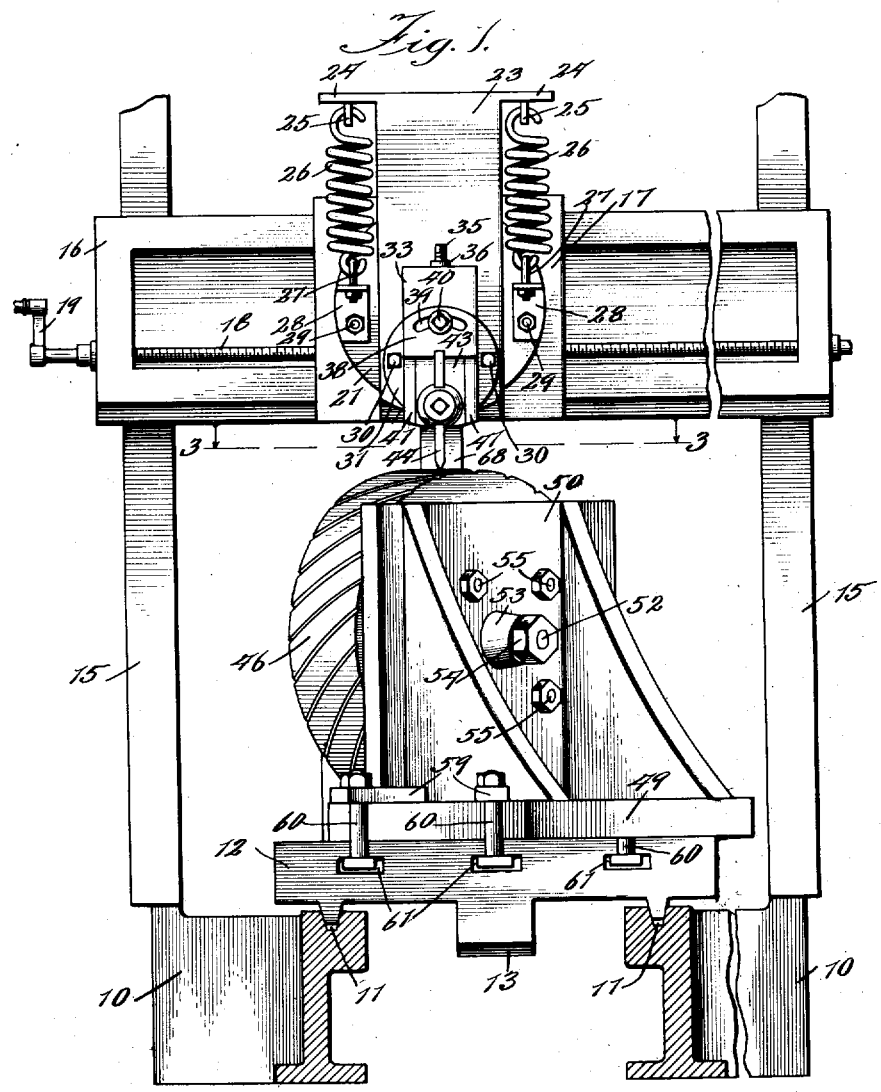
Figure 2:
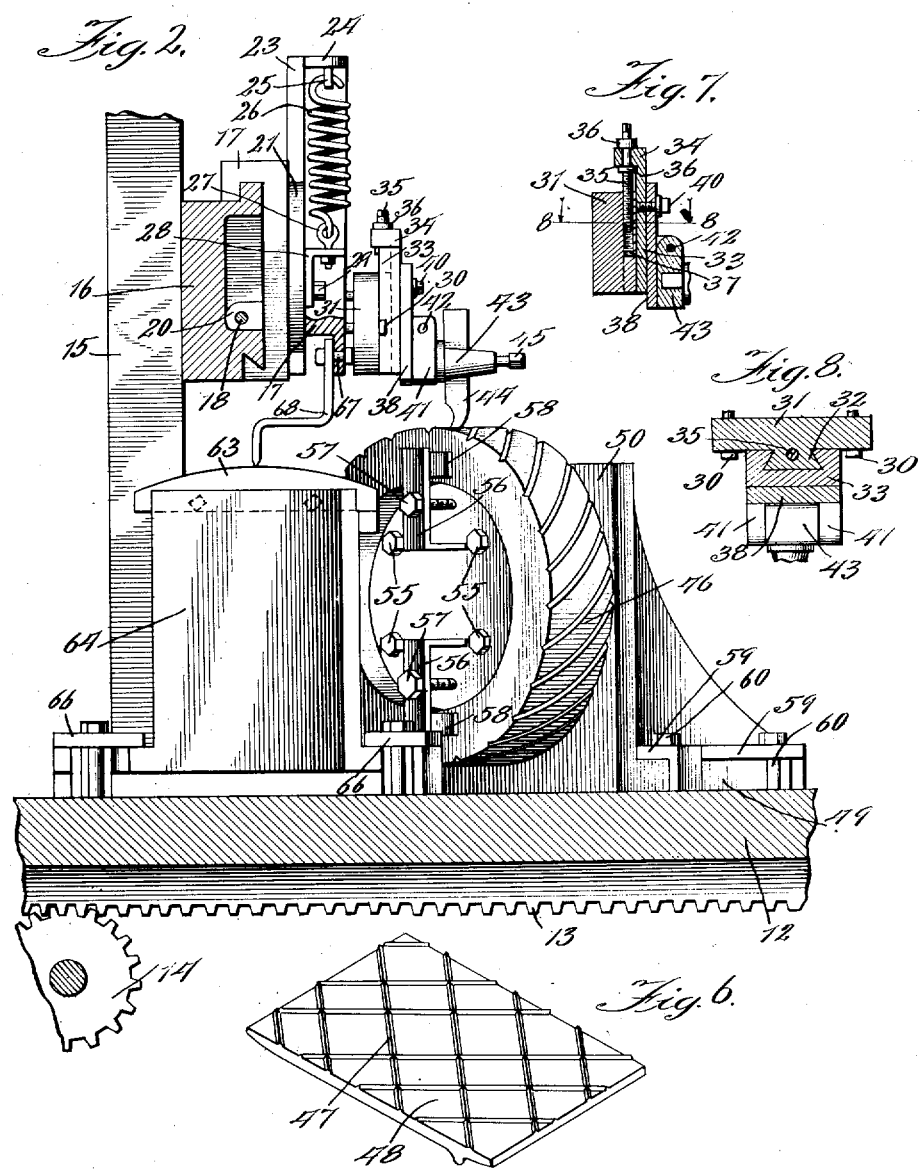
Figure 3:
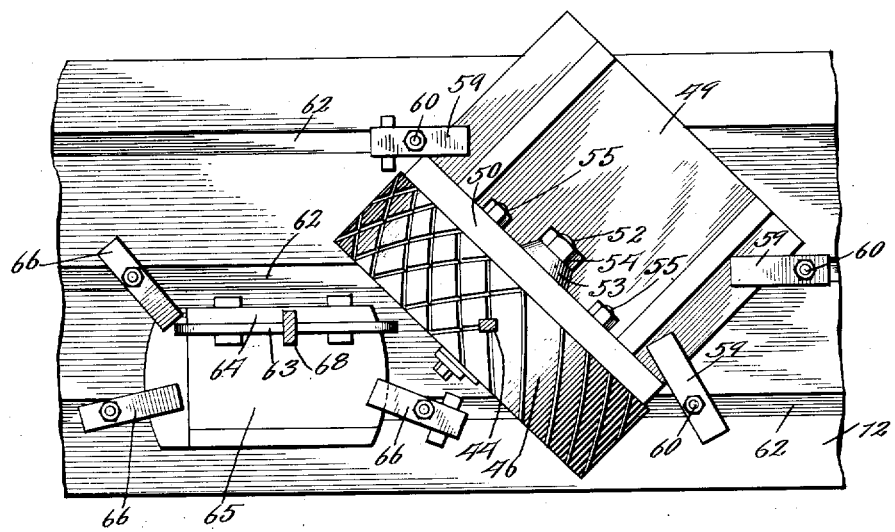
Figure 5:
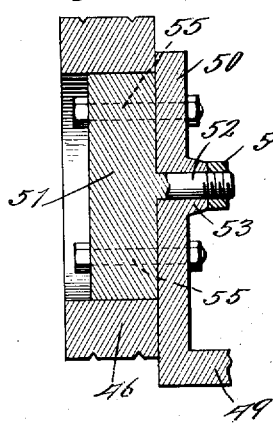
Figure 4:
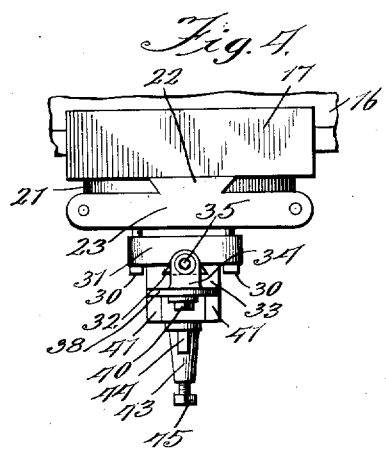

Figure 1 is a front elevation of the machine, parts being shown in section; Fig. 2, a fragmentary sectional side elevation; Fig. 3, a sectional plan taken on line 3—3 of Fig. 1; Fig. 4, a detail plan view of the cutting apparatus; Fig. 5, a section taken through a portion of the roll or collar supporting device; Fig. 6, a view in perspective of a tie plate illustrating the work that the finished roll is intended to accomplish; Fig. 7, a fragmentary vertical sectional view taken through the devices supporting the cutting tool, and Fig. 8, a sectional plan taken on line 8—8 of Fig. 7.

Like characters of reference indicate like parts in the several figures of the drawings.

Referring to the drawings, 10 represents the base of the machine formed with the ways 11, 11, in which runs the reciprocating carriage 12. The carriage may be driven by any desired means. I have shown the carriage provided on its under side with a rack 13 which is meshed by a pinion 14 which is adapted to be driven in any desired manner. Rising from the base 10 are the uprights 15 connected by a cross piece 16, suitably formed so as to support a horizontally movable head 17. Preferably a threaded shaft 18, provided with a crank 19, is revolubly mounted on the cross piece 16 and extends through threaded perforations in ears 20 on the head 17. No horizontal movement of the tool, associated with the head 17, is involved in the contemplated operation of the machine.

The arrangements above described are simply for the purpose of obtaining an initial adjustment.

The head 17 is formed, as shown, with a boss 21 provided with an undercut vertical slot adapted to receive the dovetailed porslides the vertical adjusting slide 33, formed with the projecting lugs 24 carrying rings 25, into which are hooked the upper ends of spiral springs 26, the other ends of these springs being hooked into rings 27 carried on brackets 28 attached by bolts 29 to the boss 21.

Secured by bolts 30 to slide 23 is a circular member 31 formed with a dovetailed projection 32 from its front face, over which slides the vertical adjusting slide 33, formed with a lug 34 which overhangs the dovetailed portion 32 of the circular member 31. An adjusting screw 35 is revolubly mounted in lug 34, being held from endwise movement by the collars 36, and extends into a threaded opening 37 in the dovetailed projection 32. This arrangement provides for a vertical readjustment of the tool as the work of cutting proceeds.

Bolted to the adjusting slide 33 is a plate 38, the plate being formed with the curved slot 39 and secured to the adjusting slide 33 by a screw bolt 40. This arrangement makes an angular adjustment of the cutting tool possible. Plate 38 is formed with ribs 41, 41 between which is secured, on the pivot 42, the rocking tool holder 43. The tool 44 is secured in the slot in the tool holder by means of the set screw 45. It will be understood that there might be some change in these details of construction without departure from my invention as defined by the appended claims.

The machine is designed particularly for operating upon an annular roll or collar such as that designated by the numeral 46. In order to fashion a roll or collar of this sort so that it will form the diagonal ribs 47 on the under side of a tie plate 48 (as shown in Fig. 6), or other similar article, it is necessary to make two series of cuts in the perimeter of the roll diagonally thereof and transverse with respect to each other. With my machine constructed and organized, as by preference I construct and organize it, this is accomplished by supporting the roll in an upright position on the carriage and in a position oblique with respect to the travel of the carriage. Preferably, when the roll is of the annular form shown, it is so supported that after one cut has been made, it may be simply rotated on the supporting means so as to position it for the next cut parallel thereto. This arrangement simplifies the cutting operation and gives accuracy to the work, as it is only necessary, for the proper positioning of the cuts, to rotate the collar a distance equal to the intended distances between parallel cuts.

The preferred means of support is made up of the following parts. A heavy plate 49 is provided having an upright web or plate 50 to which is secured a circular block 51. The block has the central threaded projection 52 extending through a boss 53 on plate 50 and secured thereto by the nut 54. The block 51 is additionally secured to plate 50 by the bolts 55. The roll or collar 46 designed to be operated upon, the inner surface of which has been accurately turned so as to fit on the block 51, is secured in the successive positions for making the cuts, by the clamping members 56 and set screws 57, blocks or strips 58 being interposed between the clamping members and the side face of the roll. The roll supporting device, above described, is secured to the carriage 12 in the desired oblique position by means of the clamps 59 which overlap the edges of plate 49 and bolts 60, the heads of which lie in the enlargements 61 of the slots 62 in the base or platform of the carriage. After one series of diagonal cuts has been completed the position of the supporting device on the collar may be reversed and the other series of cuts transverse to the first mentioned cuts made in the same manner.

I do not claim specifically herein the means for supporting the collar as above described, as these devices and arrangements are made the subject matter of, and are claimed specifically in my application for patent, Serial No. 542,316, filed February 5, 1910, of which the present application is a division.

The diagonal arrangement of the cuts on the circular perimeter of the collar necessitates a vertical shifting of the tool at each cut, dependent upon the angle between the roll and the line of travel of the carriage. This movement of the tool is effected against the tension of springs 26 and its character is determined by a templet supported on the carriage 12. This templet is designated 63 and is bolted to a standard 64 having a foot 65 adapted to be clamped to the carriage 12 by the clamps 66. Slide 23 is formed with a depending part 67 to which is bolted a follower 68 adapted to be engaged by templet 63 when the carriage is moved back and forth. This lifts the slide 23 against the tension of springs 26 during the first part of the cut, and afterward allows the slide and the tool to move downwardly during the latter part of the cut. On the back stroke the tool carrier 43 can swing a trifle on its pivot 42.

The operation of the machine will be perhaps very obvious from the foregoing. In résumé, it may be said that when a collar of the sort shown is to be cut, it is first clamped upon the supporting device against the vertical plate 50 thereof. The templet 63, having been already formed on a proper curve, is clamped to the carriage lengthwise thereof, and thereupon the supporting device for the roll adjusted to the proper angular position to give the desired cut. The initial cut is made by reciprocating the carriage back and forth, which can be done without attendance except occasionally it will be necessary to readjust the adjusting slide 33. It will be observed that the tool is at all times, within the limits of the spring action, pressed against the work so that only occasionally adjustment of the adjusting slide 33 is necessary. When the first cut is finished, clamps 56 are loosened and the collar rotated into place for the next cut, whereupon the above described operation is repeated. In order to make the series of cuts transverse to the first series, it is only necessary to shift the position of the roll supporting device.

While I have described a preferred form of apparatus for accomplishing the result desired, it will be obvious that there might be some changes made therein without departure from my invention. Therefore I do not limit myself to the exact arrangements, constructions and devices shown except so far as certain of these particulars are made limitations on certain of the claims herein.

I claim:

1. In apparatus of the character described, the combination with a reciprocating carriage, of means on said carriage adapted to support a metal roll in upright position oblique to the line of travel of said carriage, a cutting tool, a stationary support on which the tool is mounted so as to be capable of vertical movement, a spring which forces said tool into contact with the surface of said roll, a templet on the carriage, and a follower associated with said tool adapted to be engaged by said templet so as to raise said tool against the tension of said spring.

2. In apparatus of the character described, the combination with a reciprocating carriage, of means on said carriage adapted to support a roll in an upright position oblique to the line of travel of the carriage, a cutting tool, a stationary support on which said tool is mounted so as to be capable of vertical movement, a templet which is arranged on the carriage in line with the direction of travel thereof, and a follower associated with said tool adapted to be engaged by said templet so as to raise the tool, substantially as described.

3. In apparatus of the character described, the combination with a reciprocating carriage, of means thereon for supporting a roll, a stationary framework, a slide vertically movable with respect to said framework, a pair of springs attached, one at each side, to said slide and anchored to the framework, a tool associated with said slide, a templet on said carriage, and a follower attached to said slide which is engaged by said templet when the carriage is reciprocated and raises said slide against the tension of said springs.

4. In apparatus of the character described, the combination with a reciprocating carriage, of means thereon for supporting a roll on edge and oblique to the line of travel of the carriage, a stationary framework, a slide vertically movable with respect to said framework, a pair of springs attached, one at each side, to said slide and anchored to the framework, a tool associated with said slide, a templet arranged on the carriage in line with the direction of travel of the carriage, and a follower attached to said slide and adapted to be engaged by said templet so as to raise the slide against the tension of said springs.

5. In apparatus of the character described, the combination with a reciprocating carriage, of means thereon for supporting a roll on edge oblique to the line of travel of said carriage, a stationary framework, a head on said framework, a slide vertically movable in the head, a pair of springs attached to the slide, one at each side, and anchored to the head, an adjusting slide movable vertically with respect to said first mentioned slide, an adjusting screw for the same, a plate secured to said adjusting slide so as to be capable of angular adjustment, a rocking tool carrier pivoted to said plate and provided with a tool, a templet arranged in line with the travel of the carriage, and a follower on said slide adapted to be engaged by said templet.

GOTTFRID KNAUS.

Witnesses:
P. H. TRUMAN,
L. A. FALKENBERG.

---

It is hereby certified that in Letters Patent No. 1,000,681, granted August 15, 1911, upon the application of Gottfrid Knaus, of Chicago, Illinois, for an improvement in "Machines for Cutting Metal Rolls," an error appears in the printed specification requiring correction, as follows: Page 1, line 63, the words and reference-numeral "slides the vertical adjusting slide 33," should be stricken out and the syllable and words and reference-numerals *tion 22 of a slide 23. Slide 23 is* inserted instead; and that the said Letters Patent should be read with this correction therein that the same may conform to the record of the case in the Patent Office.

Signed and sealed this 12th day of September, A. D., 1911.

[SEAL.]

E. B. MOORE,
*Commissioner of Patents.* the carriage in line with the direction of travel thereof, and a follower associated with said tool adapted to be engaged by said templet so as to raise the tool, substantially as described.

3. In apparatus of the character described, the combination with a reciprocating carriage, of means thereon for supporting a roll, a stationary framework, a slide vertically movable with respect to said framework, a pair of springs attached, one at each side, to said slide and anchored to the framework, a tool associated with said slide, a templet on said carriage, and a follower attached to said slide which is engaged by said templet when the carriage is reciprocated and raises said slide against the tension of said springs.

4. In apparatus of the character described, the combination with a reciprocating carriage, of means thereon for supporting a roll on edge and oblique to the line of travel of the carriage, a stationary framework, a slide vertically movable with respect to said framework, a pair of springs attached, one at each side, to said slide and anchored to the framework, a tool associated with said slide, a templet arranged on the carriage in line with the direction of travel of the carriage, and a follower attached to said slide and adapted to be engaged by said templet so as to raise the slide against the tension of said springs.

5. In apparatus of the character described, the combination with a reciprocating carriage, of means thereon for supporting a roll on edge oblique to the line of travel of said carriage, a stationary framework, a head on said framework, a slide vertically movable in the head, a pair of springs attached to the slide, one at each side, and anchored to the head, an adjusting slide movable vertically with respect to said first mentioned slide, an adjusting screw for the same, a plate secured to said adjusting slide so as to be capable of angular adjustment, a rocking tool carrier pivoted to said plate and provided with a tool, a templet arranged in line with the travel of the carriage, and a follower on said slide adapted to be engaged by said templet.

GOTTFRID KNAUS.

Witnesses:
P. H. TRUMAN,
L. A. FALKENBERG.

---

Correction in Letters Patent No. 1,000,681.

It is hereby certified that in Letters Patent No. 1,000,681, granted August 15, 1911, upon the application of Gottfrid Knaus, of Chicago, Illinois, for an improvement in "Machines for Cutting Metal Rolls," an error appears in the printed specification requiring correction, as follows: Page 1, line 63, the words and reference-numeral "slides the vertical adjusting slide 33," should be stricken out and the syllable and words and reference-numerals *tion 22 of a slide 23. Slide 23 is* inserted instead; and that the said Letters Patent should be read with this correction therein that the same may conform to the record of the case in the Patent Office.

Signed and sealed this 12th day of September, A. D., 1911.

[SEAL.]

E. B. MOORE,
*Commissioner of Patents.*

Correction in Letters Patent No. 1,000,681.

It is hereby certified that in Letters Patent No. 1,000,681, granted August 15, 1911, upon the application of Gottfrid Knaus, of Chicago, Illinois, for an improvement in "Machines for Cutting Metal Rolls," an error appears in the printed specification requiring correction, as follows: Page 1, line 63, the words and reference-numeral "slides the vertical adjusting slide 33," should be stricken out and the syllable and words and reference-numerals *tion 22 of a slide 23. Slide 23 is* inserted instead; and that the said Letters Patent should be read with this correction therein that the same may conform to the record of the case in the Patent Office.

Signed and sealed this 12th day of September, A. D., 1911.

[SEAL.]
E. B. MOORE,
*Commissioner of Patents.*